US010606578B2

(12) United States Patent
Kruglikov et al.

(10) Patent No.: US 10,606,578 B2
(45) Date of Patent: Mar. 31, 2020

(54) PROVISIONING OF PLUGGABLE DATABASES USING A CENTRAL REPOSITORY

(71) Applicant: Oracle International Corporation, Redwood Shores, CA (US)

(72) Inventors: Andre Kruglikov, Atherton, CA (US); Kumar Rajamani, San Ramon, CA (US); Debaditya Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 20 days.

(21) Appl. No.: 15/266,902

(22) Filed: Sep. 15, 2016

(65) Prior Publication Data

US 2018/0075044 A1 Mar. 15, 2018
US 2020/0004838 A9 Jan. 2, 2020

Related U.S. Application Data

(60) Provisional application No. 62/245,937, filed on Oct. 23, 2015.

(51) Int. Cl.
    *G06F 17/30* (2006.01)
    *G06F 8/61* (2018.01)
    *G06F 16/21* (2019.01)

(52) U.S. Cl.
    CPC .................. *G06F 8/62* (2013.01); *G06F 8/63* (2013.01); *G06F 16/214* (2019.01)

(58) Field of Classification Search
    CPC ...................................................... G06F 17/30
    See application file for complete search history.

(56) References Cited

U.S. PATENT DOCUMENTS 6,185,699 B1 2/2001 Haderle
6,205,449 B1 3/2001 Rastogi
(Continued)

FOREIGN PATENT DOCUMENTS

WO WO 2006/045844 A1 5/2006
WO WO 2014/052851 A1 4/2014
(Continued)

OTHER PUBLICATIONS

Rajeev Kumar et al., ORACLE DBA, A Helping Hand, Container Database and Pluggable Database (CDB & PDB), retrieved from the internet on Dec. 4, 2013, 2 pages.
(Continued)

*Primary Examiner* — Khanh B Pham
(74) *Attorney, Agent, or Firm* — Hickman Palermo Becker Bingham LLP; Brian N. Miller

(57) ABSTRACT

Techniques herein use rules automation and template pluggable databases to facilitate deployment into container databases. In an embodiment, a system of computers loads rules into a rules engine. Each rule associates a predicate with suitable container databases. The system receives a request to install a target pluggable database. The rules engine detects satisfied rules whose predicates match the request. Based on the suitable container databases of the satisfied rules, the rules engine selects a particular container database. The system installs the target pluggable database into the particular container database. In an embodiment, a system of computers stores a plurality of template pluggable databases in a repository. The repository receives an installation request. Based on the installation request, the system selects a particular template pluggable database. The system installs the particular template pluggable database into a container database.

19 Claims, 6 Drawing Sheets

(56) References Cited

U.S. PATENT DOCUMENTS

| | | |
|---|---|---|
| 6,226,650 B1 | 5/2001 | Mahajan |
| 6,295,610 B1 | 9/2001 | Ganesh |
| 6,502,102 B1 | 12/2002 | Haswell |
| 6,633,878 B1 | 10/2003 | Underwood |
| 6,638,878 B2 | 10/2003 | Restaino |
| 6,804,671 B1 | 10/2004 | Loaiza et al. |
| 6,973,647 B2 | 12/2005 | Crudele |
| 7,136,857 B2 | 11/2006 | Chen |
| 7,305,421 B2 | 12/2007 | Cha |
| 7,418,435 B1 | 8/2008 | Sedlar |
| 7,493,311 B1 | 2/2009 | Cutsinger |
| 7,571,173 B2 | 8/2009 | Yang |
| 7,620,620 B1 | 11/2009 | Sedlar |
| 7,620,623 B2 | 11/2009 | Sedlar |
| 7,822,717 B2 | 10/2010 | Kappor et al. |
| 8,065,320 B2 | 11/2011 | Sedlar |
| 8,117,174 B2 | 2/2012 | Shaughessey |
| 8,161,085 B2 | 4/2012 | Souder |
| 8,335,767 B2 | 12/2012 | Das et al. |
| 8,364,648 B1 | 1/2013 | Sim-Tang |
| 8,478,718 B1 | 7/2013 | Ranade |
| 8,554,762 B1 | 10/2013 | O'Neill |
| 8,600,977 B2 | 12/2013 | Dageville et al. |
| 9,026,679 B1 | 5/2015 | Shmuylovich |
| 9,122,644 B2 | 9/2015 | Kruglikov et al. |
| 9,189,522 B2 | 11/2015 | Das et al. |
| 9,280,591 B1 | 3/2016 | Kharatishvili |
| 9,298,564 B2 | 3/2016 | Lee |
| 9,390,120 B1 | 7/2016 | Gulliver |
| 9,396,220 B2 | 7/2016 | Li |
| 9,507,843 B1 | 11/2016 | Madhavarapu |
| 9,684,561 B1 | 6/2017 | Yan |
| 2002/0112022 A1 | 8/2002 | Kazar et al. |
| 2002/0143733 A1 | 10/2002 | Mukkamalla |
| 2003/0061537 A1 | 3/2003 | Cha et al. |
| 2003/0074360 A1 | 4/2003 | Chen |
| 2004/0039962 A1 | 2/2004 | Ganesh |
| 2004/0054643 A1 | 3/2004 | Vermuri |
| 2004/0054644 A1 | 3/2004 | Ganesh |
| 2004/0177099 A1 | 9/2004 | Ganesh |
| 2004/0210577 A1 | 10/2004 | Kundu |
| 2004/0267809 A1 | 12/2004 | East et al. |
| 2005/0038831 A1 | 2/2005 | Souder et al. |
| 2005/0149552 A1 | 7/2005 | Chan et al. |
| 2005/0256908 A1 | 11/2005 | Yang |
| 2005/0278276 A1 | 12/2005 | Andreev et al. |
| 2005/0283478 A1 | 12/2005 | Choi |
| 2006/0047626 A1 | 3/2006 | Raheem |
| 2006/0047713 A1 | 3/2006 | Gornshtein |
| 2007/0083563 A1 | 4/2007 | Souder |
| 2007/0100912 A1 | 5/2007 | Pareek et al. |
| 2007/0118527 A1 | 5/2007 | Winje |
| 2007/0244918 A1 | 10/2007 | Lee et al. |
| 2008/0016123 A1 | 1/2008 | Devraj et al. |
| 2009/0228589 A1* | 9/2009 | Korupolu ............ H04L 67/1097 709/226 |
| 2009/0282203 A1 | 11/2009 | Haustein |
| 2010/0185645 A1 | 7/2010 | Pazdziora |
| 2010/0318570 A1 | 12/2010 | Narasinghanallur et al. |
| 2011/0004586 A1 | 1/2011 | Cherryholmes et al. |
| 2011/0060724 A1 | 3/2011 | Chan |
| 2011/0087633 A1 | 4/2011 | Kreuder et al. |
| 2011/0126197 A1 | 5/2011 | Larsen et al. |
| 2011/0307450 A1 | 12/2011 | Hahn et al. |
| 2012/0109926 A1 | 5/2012 | Novik et al. |
| 2012/0173717 A1 | 7/2012 | Kohli |
| 2012/0284228 A1 | 11/2012 | Ghosh |
| 2012/0284544 A1 | 11/2012 | Xian |
| 2012/0287282 A1 | 11/2012 | Lu |
| 2012/0323849 A1 | 12/2012 | Garin |
| 2013/0085742 A1 | 4/2013 | Barker et al. |
| 2013/0117237 A1 | 5/2013 | Thomsen et al. |
| 2013/0198133 A1 | 8/2013 | Lee |
| 2013/0212068 A1 | 8/2013 | Talius et al. |
| 2014/0032525 A1 | 1/2014 | Merriman et al. |
| 2014/0095452 A1 | 4/2014 | Lee et al. |
| 2014/0095530 A1* | 4/2014 | Lee .................. G06F 11/1471 707/769 |
| 2014/0095546 A1 | 4/2014 | Kruglikov et al. |
| 2014/0164331 A1 | 6/2014 | Li et al. |
| 2014/0188804 A1 | 7/2014 | Gokhale |
| 2014/0258241 A1 | 9/2014 | Chen |
| 2014/0337336 A1 | 11/2014 | Carlson |
| 2015/0120659 A1 | 4/2015 | Srivastava |
| 2015/0120780 A1* | 4/2015 | Jain .................. G06F 21/6227 707/783 |
| 2015/0254240 A1 | 9/2015 | Li et al. |
| 2015/0370641 A1 | 12/2015 | Susairaj |
| 2016/0188621 A1 | 6/2016 | Karinta et al. |
| 2016/0352836 A1 | 12/2016 | Kamalakantha |
| 2017/0048314 A1 | 2/2017 | Aerdts |
| 2017/0116207 A1 | 4/2017 | Lee |
| 2017/0116213 A1 | 4/2017 | Jain |
| 2017/0116278 A1 | 4/2017 | Baby et al. |
| 2017/0116298 A1 | 4/2017 | Ravipati |
| 2017/0116321 A1 | 4/2017 | Jain et al. |
| 2017/0116334 A1 | 4/2017 | Kruglikov et al. |
| 2017/0315877 A1 | 11/2017 | Kaplingat |
| 2018/0060177 A1 | 3/2018 | Shanthaveerappa |
| 2018/0060181 A1 | 3/2018 | Rajamani |
| 2018/0075041 A1 | 3/2018 | Susairaj |
| 2018/0075086 A1 | 3/2018 | Yam |
| 2019/0102384 A1 | 4/2019 | Hung et al. |
| 2019/0102411 A1 | 4/2019 | Hung et al. |

FOREIGN PATENT DOCUMENTS

| | | | |
|---|---|---|---|
| WO | WO2014/052851 A1 | 4/2014 | |
| WO | WO 2014/145230 A1 | 9/2014 | |

OTHER PUBLICATIONS

Preimesberger, Chris, "Oracle Profits Up, but Revenues Slip" Oracle, dated Sep. 20, 2012, 2 pages.

Oracle Base, Multitenant: Create and Configure a Pluggable Database (PDB) In Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud", 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages Sata's DBA Blog: "Oracle Statistics", dated Jan. 3, 2013, http://satya-dba.blogspot.com/2010/06/oracle-database-statistics-rbo-cbo.html, 14 pages.

Gey et al., "Evolving Multi-tenant SaaS Applications through Self-Adaptive Upgrade Enactment and Tenant Mediation", SEAMS'16 May 16-17, 2016, Austin, TX, USA 2016 AC,7 pages.

Susairaj, U.S. Appl. No. 15/266,340, filed Sep. 15, 2016, Interview Summary, dated Jan. 3, 2019.

Ravipati, U.S. Appl. No. 15/215,443, filed Jul. 20, 2016, Interview Summary, dated Jan. 4, 2019.

Rajamani, U.S. Appl. No. 15/254,884, filed Sep. 1, 2016, Final Office Action, dated Nov. 21, 2018.

U.S. Appl. No. 14/202,091, filed Mar. 10, 2014, Notice of Allowance, dated Feb. 26, 2016.

(56) References Cited

OTHER PUBLICATIONS

U.S. Appl. No. 13/830,349, filed Mar. 14, 2013, Office Action, dated Nov. 5, 2014.
U.S. Appl. No. 13/830,349, filed Mar. 14, 2013, Notice of Allowance, dated Oct. 19, 2015.
U.S. Appl. No. 13/830,349, filed Mar. 14, 2013, Interview Summary, dated Mar. 9, 2015.
U.S. Appl. No. 13/830,349, filed Mar. 14, 2013, Final Office Action, dated Jun. 2, 2015.
U.S. Appl. No. 13/631,815, filed Sep. 28, 2012, Office Action, dated Nov. 6, 2014.
U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed Sep. 28, 2012, Office Action, dated Dec. 23, 2013.
U.S. Appl. No. 13/631,815, filed Sep. 28, 2012, Office Action, dated May 29, 2014.
Yam, U.S. Appl. No. 15/266,917, filed Sep. 15, 2016, Interview Summary, dated Oct. 19, 2018.
Susairaj, U.S. Appl. No. 15/226,340, filed Sep. 15, 2016, Office Action, dated Oct. 30, 2018.
Shanthaveerappa, U.S. Appl. No. 15/244,867, filed Aug. 23, 2016, Interview Summary, dated Oct. 30, 2018.
Ravipati, U.S. Appl. No. 15/215,443, filed Jul. 20, 2016, Office Action, dated Sep. 19, 2018.
Rajamani, U.S. Appl. No. 15/254,884, filed Sep. 1, 2016, Interview Summary, dated Sep. 24, 2018.
Lee, U.S. Appl. No. 15/215,446, filed Jul. 20, 2016, Restrcition Requirement, dated Oct. 1, 2018.
Lee, U.S. Appl. No. 15/215,446, filed Jul. 20, 2016, Office Action, dated Nov. 16, 2018.
Baby, U.S. Appl. No. 15/331,657, filed Oct. 21, 2016, Office Action, dated Aug. 28, 2018.
Zisman et al., "An approach to interoperation between autonomous database systems", Distrib. Syst. Engng 6 (1999) 135-148. Printed in the UK, 15 pages.
Weishar et al., "An Intelligent Heterogeneous Autonomous Database Architecture for Semantic Heterogeneity Support", IEEE Workshop on Interoperability in Multidatabase Systems, dated Apr. 1991, 9 pgs.
Rodd et al., "Adaptive Tuning Algorithm for Performance tuning of Database Management System", (IJCSIS) International Journal of Computer Science Information Security,vol. 8, No. 1, Apr. 2010, 4pgs.
Pavlo, "Self-Driving Database Management Systems", 8th Biennial Conference on Innovative Data Systems Research (CIDR '17), Jan. 8-11, 2017 , Chaminade, California, USA, 6 pages.

Maenhaut et al., "Design and Evaluation of a Hierarchical Multi-Tenant Data Management Framework for Cloud Applications", dated 2015, 6 pages.
Das et al., "Scalable and Elastic Transactional Data Stores for Cloud Computing Platforms", dated Dec. 2011, 302 pages.
Das et al., "Automated Demand-Driven Resource Scaling in Relational Database-as-aService", SIGMOD'16, Jun. 26-Jul. 1, 2016, San Francisco, CA, USA, 12 pages.
Beschastnikh et al., "Machine Learning for Automatic Physical DBMS Tuning", dated Dec. 6, 2007, 6 pages.
Agrawal et al., "Database Scalability, Elasticity, and Autonomy in the Cloud", dated 2011, 14 pages.
Shanthaveerappa, U.S. Appl. No. 15/244,867, filed Aug. 23, 2016, Office Action, dated Jun. 28, 2018.
Rajamani, U.S. Appl. No. 15/254,884, filed Sep. 1, 2016, Office Action, dated Jun. 27, 2018.
Ravipati, U.S. Appl. No. 15/215,443, filed Jul. 20, 2016, Advisory Action, dated Jun. 5, 2019.
Lee, U.S. Appl. No. 15/215,446, filed Jul. 20, 2016, Advisory Action, dated Jun. 4, 2019.
Yam, U.S. Appl. No. 15/266,917, filed Sep. 15, 2016, Advisory Action, dated Apr. 29, 2019.
Susairaj, U.S. Appl. No. 15/266,340, filed Sep. 15, 2016, Final Office Action, dated Mar. 26, 2019.
Shanthaveerappa, U.S. Appl. No. 15/244,867, filed Aug. 23, 2016, Notice of Allowance, dated Apr. 4, 2019.
Lee, U.S. Appl. No. 15/215,446, filed Jul. 20, 2016, Interview Summary, dated May 3, 2019.
Baby, U.S. Appl. No. 15/331,657, filed Oct. 21, 2016, Notice of Allowance, dated Mar. 4, 2019.
Kruglikov, U.S. Appl. No. 15/331,525, filed Oct. 21, 2016, Notice of Allowance, dated Oct. 17, 2019.
Kruglikov, U.S. Appl. No. 15/331,525, filed Oct. 21, 2016, Interview Summary, dated Aug. 28, 2019.
Oracle White Paper Database Live Migration with Oracle Multitenant and the Oracle Universal Connection Pool on Oracle Real Application Clusters (RAC), dated Oct. 15, 2014, 12 pages.
Urbano Randy et al., "Oracle Database Administrator's Guide", 12c Release dated Jul. 31, 2017, pp. 1-1500.
Yam, U.S. Appl. No. 15/266,917, filed Sep. 15, 2016, Final Office Action, dated Feb. 4, 2019.
Shanthaveerappa, U.S. Appl. No. 15/244,867, filed Aug. 23, 2016, Interview Summary, dated Mar. 14, 2019.
Shanthaveerappa, U.S. Appl. No. 15/244,867, filed Aug. 23, 2016, Final Office Action, dated Jan. 24, 2019.
Ravipati, U.S. Appl. No. 15/215,443, filed Jul. 20, 2016, Final Office Action, dated Mar. 11, 2019.
Lee, U.S. Appl. No. 15/215,446, filed Jul. 20, 2016, Final Office Action, dated Mar. 12, 2019.
Jain, U.S. Appl. No. 15/093,506, filed Apr. 7, 2016, Office Action, dated Mar. 20, 2019.

\* cited by examiner

PROVISIONING OF PLUGGABLE DATABASES USING A CENTRAL REPOSITORY

CROSS-REFERENCE TO RELATED APPLICATIONS

This application claims priority to U.S. Provisional Application No. 62/245,937 filed Oct. 23, 2015. This application also is related to the following applications, each of which is incorporated by reference as if fully set forth herein:
  Appln. Ser. No. 13/631,815, filed Sep. 28, 2012, titled "Container Database";
  U.S. Pat. No. 9,298,564, filed Mar. 14, 2013, titled "In Place Point-In-Time Recovery Of Pluggable Databases";
  Appln. Ser. No. 14/202,091, filed Mar. 10, 2014, titled "Instantaneous Unplug Of Pluggable Database From One Container Database And Plug Into Another Container Database";
  Appln. Ser. No. 15/093,506, filed Apr. 7, 2016, titled "Migrating A Pluggable Database Between Database Server Instances With Minimal Impact To Performance";
  Appln. Ser. No. 15/215,443, filed Jul. 20, 2016, titled "Techniques For Keeping A Copy Of A Pluggable Database Up To Date With A Source Pluggable Database In Read-Write Mode"; and
  Appln. Ser. No. 15/215,446, filed Jul. 20, 2016, titled "Near-zero Downtime Relocation of a Pluggable Database across Container Databases".

FIELD OF THE DISCLOSURE

This disclosure relates to allocation of multitenant database systems. Techniques that use rules automation and template pluggable databases to facilitate deployment into container databases are presented.

BACKGROUND

Database consolidation involves distributing and sharing computing resources among multiple databases managed by one or more database servers of database management systems (DBMS). Databases may be consolidated using a container DBMS. A multitenant container database (CDB) includes one or more pluggable databases (PDBs). In a container DBMS, each pluggable database may be open or closed in the container database independently from other pluggable databases.

Pluggable databases may be "plugged in" to a container database, and may be transported between database servers and/or DBMSs. The container DBMS may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

An application may access a pluggable database by establishing a database session on the container DBMS for that pluggable database, where a database session represents the connection between an application and the container DBMS for accessing the pluggable database. A database session is initiated for a pluggable database by, for example, transmitting a request for a new connection to the container DBMS, the request specifying the pluggable database. A container DBMS may host multiple database sessions, each database session being for one of multiple pluggable databases.

One of the big advantages of container database architecture is the ability to provision new databases quickly. However, in order to clone a particular source PDB, the source PDB generally needs to be in read-only mode. In read-only mode, write operations are prohibited and, as such, the work that can be performed on the source PDB in read-only mode is severely limited. Thus, the requirement for a source PDB to be in read-only mode throughout the potentially significant duration of a cloning operation can generate similarly significant downtime for the source PDB. For example, copying files for a terabyte-sized PDB over a network can take days, during which no write operations may be performed on the source PDB that is required to be in read-only mode for the cloning operation.

One way to clone a PDB is by using third party tools. However, since third-party tools are not native to the database, such tools do not have access to many optimizations that are available natively in many databases. Furthermore, it takes effort for database administrators to configure third-party tools to enable them to work with (and clone) data from a given CDB. As such, working with third-party tools to perform cloning operations on PDBs significantly increases the database provisioning costs and slows down application development that requires PDB cloning.

Moving a PDB between container databases presents many of the same problems as cloning a PDB. For example, moving the data for a PDB from a source CDB to a destination CDB can take a significant amount of time (i.e., on the order of days for very large PDBs). It is also costly to make a PDB unavailable for the duration of moving the PDB. Also, relocating a PDB to a destination CDB can be disruptive to users that use data from the PDB at the source CDB.

Generally, moving the files for a PDB between container DBMSs may be accomplished in multiple ways, including: copying the files to an external hard drive and physically moving the hard drive to the location of the destination storage, setting up an auxiliary DBMS that leverages replication to synchronize changes across container databases, and live migration of virtual machines from one physical server to another.

The architecture of a container DBMS greatly facilitates transporting databases between database servers and/or DBMSs. Tablespace files and a data dictionary store may be moved between environments of container DBMSs using readily available mechanisms for copying and moving files. The tablespace files, along with supporting files, are referred to herein collectively as a transportable database package. However, a transportable database package is a logical set of loose files, which may be difficult to identify and manage.

Once the transportable database package of a pluggable database is moved to the environment of the target container DBMS, the pluggable database can be plugged into the target container DBMS. In an embodiment, plugging in the pluggable database is performed in response to receiving a DDL command to plug in the pluggable database, the DDL command also identifying the transportable database package. In response to receiving the DDL command, the container DBMS plugs in the pluggable database. Plugging in the pluggable database entails such operations as updating a root database dictionary to define the pluggable database, such updates including, for example, adding a record to a metadata table. Error checking is also performed. For example, checks are performed to ensure that the name of the pluggable database is unique within the container DBMS and that tablespace files are not already being used for other tablespaces in the container DBMS.

A container DBMS provides advantages for database consolidation. Among such advantages is providing a high degree of isolation concurrently along with a high degree of resource sharing. Multiple pluggable databases may run on the same database server and/or database server instance, allowing the computing resources of a single database server or instance to be shared between multiple pluggable databases.

Another important advantage is fast provisioning of databases. A transportable database package of a source pluggable database may be copied to quickly create a new target pluggable database as a clone of the source pluggable database. The provisioning of a pluggable database is primarily bounded by the time required to copy files of the transportable database package and to process one or more DDL commands that require relatively little updating of metadata or other type of processing.

However, copying and moving pluggable databases may introduce complexity. For example, the infrastructural fabric of a data grid may be a diverse ecosystem with many container databases.

Not all container databases may be compatible with a given pluggable database. For example, two different pluggable databases may share compatibility with all, some, or none of the same container databases.

Furthermore, container databases readily accept installations of pluggable databases, which encourages distributed deployment, replication, horizontal scaling, and bulk deployment throughout a cluster. As such, instances of a pluggable database may benefit from a capability to be mass produced.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Example Computer System
        2.1 Container Database
        2.2 Rules Engine
        2.3 Rule Predicate
        2.4 Container Selection
    3.0 Rules Process
    4.0 Pluggable Database Transplantation
        4.1 Client Software
    5.0 Reuse Of Pluggable Database
        5.1 Repository, Template, and Prototype
        5.2 Template Selection
        5.3 Service Name
    6.0 Template Process
    7.0 Hardware Overview 1.0 General Overview Techniques are provided that use rules automation and template pluggable databases to facilitate deployment into container databases. In an embodiment, a system of computers loads rules into a rules engine. Each rule associates a predicate with suitable container databases. The system receives a request to install a target pluggable database. The rules engine detects satisfied rules whose predicates match the request. Based on the suitable container databases of the satisfied rules, the rules engine selects a particular container database. The system installs the target pluggable database into the particular container database.

In an embodiment, a system of computers stores a plurality of template pluggable databases in a repository. The repository receives an installation request. Based on the installation request, the system selects a particular template pluggable database. The system installs the particular template pluggable database into a container database.

In an embodiment, the rules engine may be invoked for reasons other than an installation request. For example, the rules engine may be invoked nightly as a cron (scheduled and repetitive) job.

For example, the system of computers may select a target container database to clone or move a pluggable database into when a threshold is crossed that embodies capacity planning, reliability, availability, scalability, serviceability, or other quality of service or administrative concern. For example, a pluggable database may be moved when a rule detects insufficient disk space due to a growth trend of the pluggable database.

2.0 Example Computer System

Figure 1:
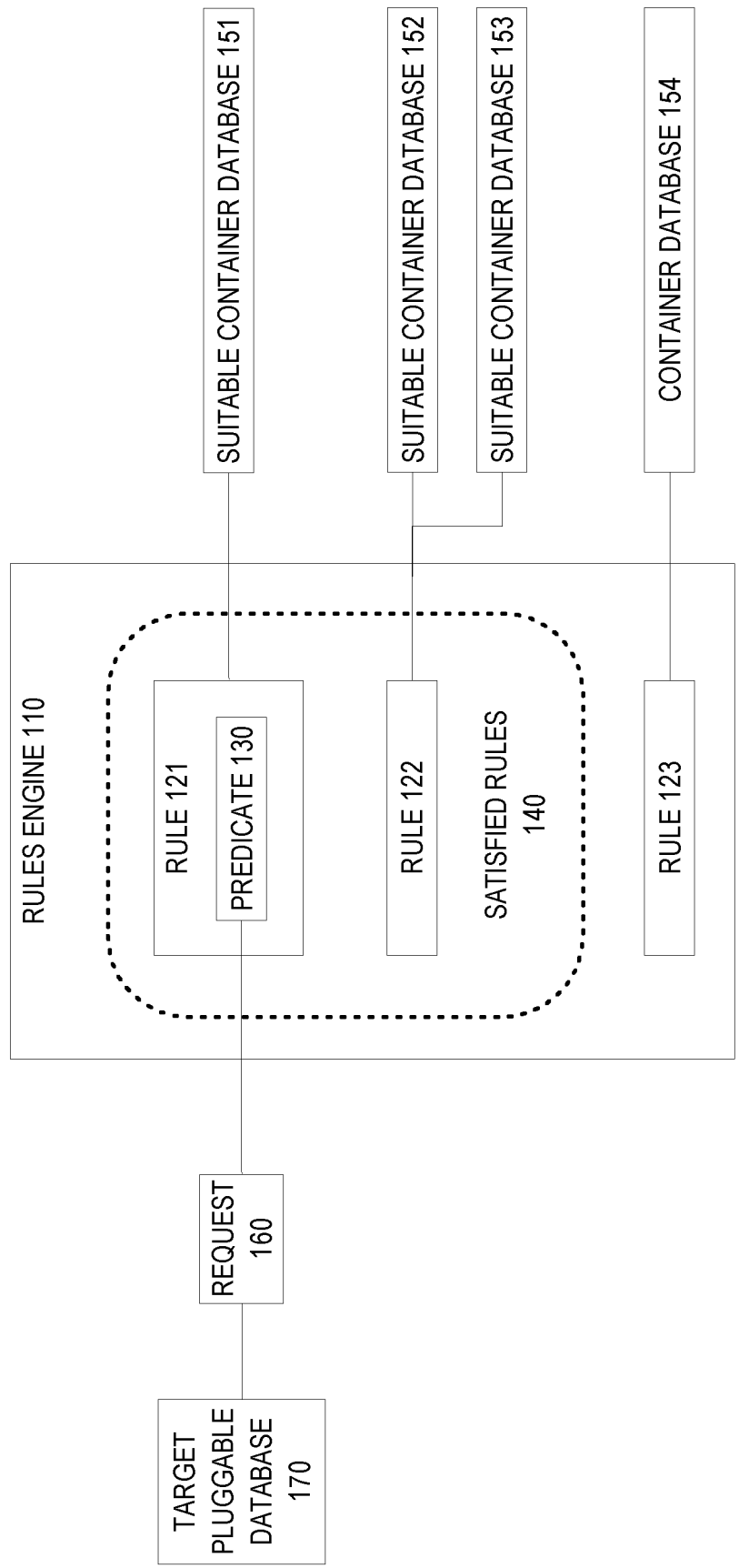
FIG. 1 is a block diagram that depicts an example computerized system that uses a rules engine to select a container database in which to install a pluggable database, in an embodiment.

FIG. 1 is a block diagram that depicts an example system of computers 100, in an embodiment. System 100 uses a rules engine to select a container database in which to install a pluggable database.

System 100 may be composed of computers such as blades or other rack servers, personal computers, mainframes, networked appliances, or virtual machines. The computers of system 100 may intercommunicate over one or more computer networks.

2.1 Container Database

Hosted by the computers of system 100 are rules engine 110 and database servers that include container databases 151-154. The database servers of container databases 151-154 need not be identical.

The database servers may have incompatible codebases. For example, the database servers may be installed from different release versions or have different patch levels.

Container databases 151-154 may have different capacities or performance characteristics, such as for disk, memory, processor, and network. Container databases 151-154 may have different reliability histories, such as uptime or mean time between failures.

Container databases 151-154 may have different backup and recovery schedules. The database servers may have different degrees of redundancy, such as replication or failover. Container databases 151-154 may occupy different security realms.

2.2 Rules Engine

Rules engine 110 may be a software system that contains rules, such as 121-123. Each of rules 121-123 associates a predicate, which specifies conditions, with a container database that suits the specified conditions.

For example, suitable container database 151 may have a disk capacity of two terabytes. Predicate 130 may specify a disk capacity of two terabytes.

Suitable container database 151 may also be associated with other rules, although not shown. For example, suitable container database 151 may be hosted by a computer that has dual processors. A rule may associate suitable container database 151 with a predicate that specifies two processors.

In operation, system 100 receives request 160 to install target pluggable database 170 into a suitable container database. For example, request 160 may identify an existing source pluggable database from which to install a copy as target pluggable database 170.

However, target pluggable database 170 may have constraints or dependencies that some available container databases cannot satisfy. For example, target pluggable database 170 may need at least a terabyte of disk space, which some container databases may lack.

Upon receiving request 160, system 100 may invoke rules engine 110. System 100 may provide to rules engine 110 the container criteria specified by request 160.

For example, request 160 may specify that at least a terabyte of disk space is needed. Request 160 may specify other criteria too.

2.3 Rule Predicate

Rule engine 100 may apply the container criteria to the predicates of rules 121-123. Each predicate may contain a compound expression that has terms connected by operators.

For example, a compound expression may contain Boolean logic operators such as for conjunction or disjunction. Rules engine 100 may take values from request 160 and apply those values to predicate 130.

Predicate 130 is satisfied if the compound expression of predicate 130 is satisfied (evaluates to true) by the values from request 160. For example, predicate 130 may specify suitability for any request that needs at most two terabytes of disk space and at most four processors.

Furthermore, each rule may associate its predicate with multiple suitable container databases. For example rule 122 may list many suitable container databases, such as 152, that have two terabytes of disk space available and four processors.

Multiple container databases may be associated with a same rule. For example, both of container databases 152-153 are associated with rule 122.

Furthermore, multiple predicates may be satisfied by the constraints of request 160. This is shown as satisfied rules 140. For example, predicate 130 may specify two terabytes of disk and four processors.

Whereas, the predicate of rule 122 may specify twenty terabytes and forty processors. The predicates of rules 121-122 may both match a same request that specifies two processors and does not specify an amount of disk space.

As such, rules 121-122 are within satisfied rules 140. Whereas, rule 123 may specify only one processor, which is insufficient for request 160. As such, rule 123 is not within satisfied rules 140.

2.3 Diverse Constraints

Predicate 130 and request 160 may specify reliability criteria. For example, reliability criteria may specify backup and recovery schedules and thresholds for uptime or mean time between failures.

Predicate 130 and request 160 may specify availability criteria. For example, availability criteria may specify a degree of redundancy, such as replication or failover.

Predicate 130 and request 160 may specify performance criteria. For example, performance criteria may specify characteristics such as a quality-of-service level or latency and throughput for host resources such as disk, memory, processor, and network.

Predicate 130 and request 160 may specify security criteria. For example, security criteria may specify a security level, a security realm, authorized roles, or operating system flavor or patch level.

Predicate 130 and request 160 may specify capacity criteria. For example, capacity criteria may specify maximum pluggable database size or an amount of disk space, memory, processors, or processor cores.

Predicate 130 and request 160 may specify qualitative criteria. For example, qualitative criteria may specify needed database features, such as packages, modules, and sibling pluggable databases of different but complementary kinds.

2.4 Container Selection

While processing request 160, rules engine 110 may identify multiple suitable container databases. For example, a satisfied rule may specify multiple container databases. Likewise, satisfied rules 140 may have multiple rules.

In either case, rules engine 110 may need to select a particular container databases from multiple suitable container databases. In an embodiment, rules engine 110 resolves such redundancy of suitable container databases by randomly selecting one from among multiple suitable ones.

In an embodiment, engine 110 resolves such redundancy by selecting a suitable container database that closest approximates the conditions specified by request 160. For example when two suitable container databases exceed a disk space required by request 160, then rules engine 110 selects the one of the two that has the least disk space.

In an embodiment, each of rules 121-123 has an assigned priority. When multiple rules satisfy a same request 160, then rules engine 110 selects the rule that has the highest priority.

For example, rules engine 110 may have a default rule whose trivial predicate is always satisfied. As such, the default rule always qualifies for membership within satisfied rules 140, regardless of what criteria does request 160 specify. However, the default rule may have the lowest priority, such that the default rule is used to select a suitable container database only when no other rule (all of which have higher priority) is satisfied by request 160.

After rules engine 110 selects a suitable container database, such as 151, then system 100 installs target pluggable database 170 into the selected container database. Furthermore, installing target pluggable database 170 into suitable container database 151 may cause conditions to change that may cause a change to one or more rules.

For example, installing target pluggable database 170 into suitable container database 151 may deplete the capacity of suitable container database 151 such that suitable container database 151 no longer satisfies the conditions of predicate 130. As such, suitable container database 151 may become dissociated from rule 121. However, there may be other rules to which rules engine 110 may newly or already associate suitable container database 151.

3.0 Rules Process

Figure 2:
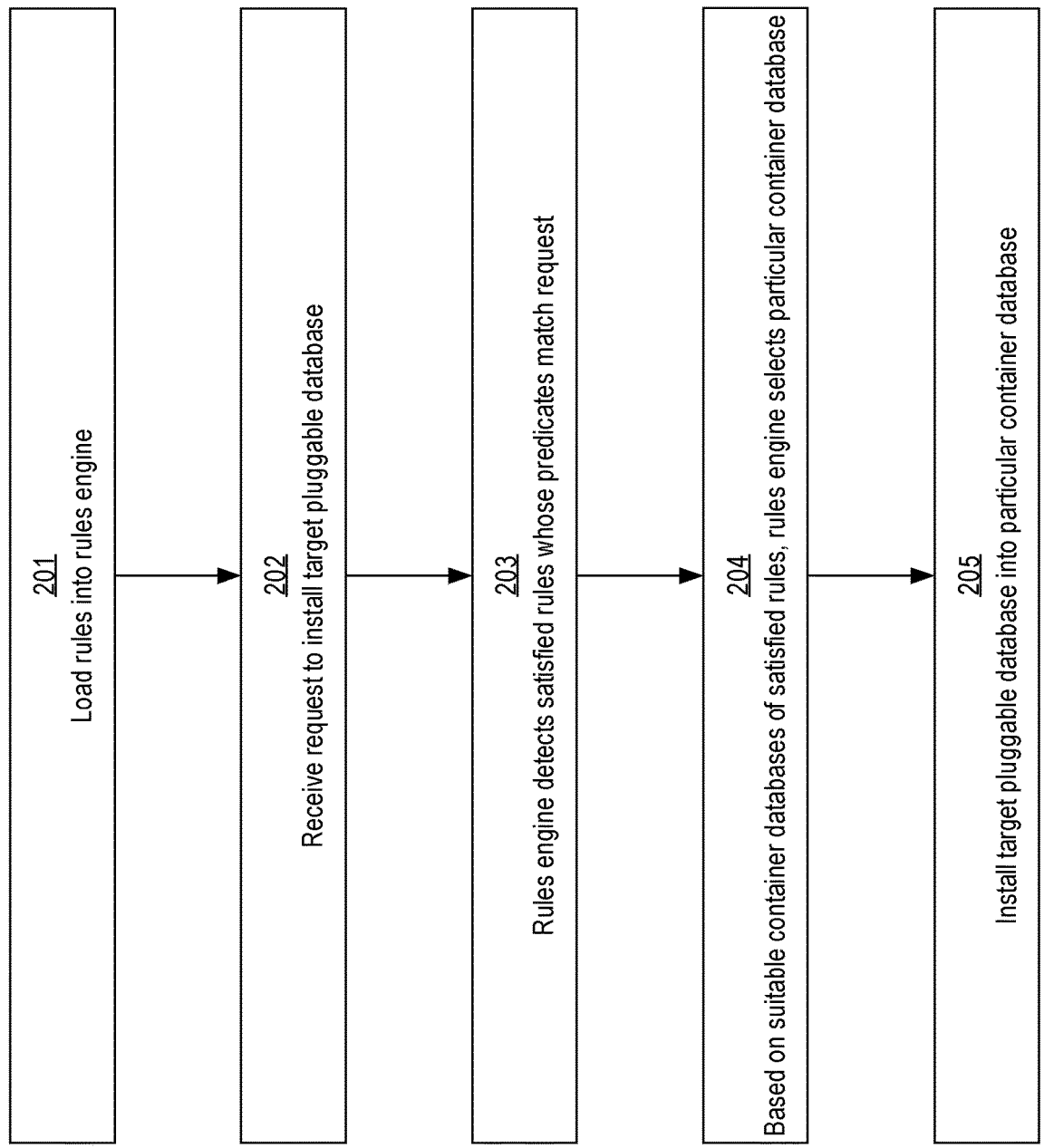
FIG. 2 is a flow diagram that depicts an example process that uses a rules engine to select a container database in which to install a pluggable database, in an embodiment.

FIG. 2 is a flow diagram that depicts an example process that uses a rules engine to select a container database in which to install a pluggable database. FIG. 2 is discussed with reference to FIG. 1.

Step 201 is preparatory. Rules are loaded into a rules engine. For example, rules engine 110 loads rules 121-123 from a database or a configuration file.

Each of rules 121-123 may be a text declaration that conforms to a formal grammar for rules. In an embodiment, rules 121-123 may be encoded as elements within an extensible markup language (XML) file.

An XML schema may define a rule grammar. An XML parser may parse the XML file according to the XML schema. In an embodiment, loading rules into rules engine 110 entails instantiating the rules as data structures within memory.

In a table-driven embodiment, each rule may be loaded as one or more rows into one or more tables of a rules database. In an embodiment, constraints of a rule may be loaded as name-value pairs within a table that associates each pair with a rule.

For example, a pair row may indicate that available processors is four. Another pair row for a same rule may indicate that available disk space is two terabytes.

In step 202, a request to install a target pluggable database is received. For example, system 100 receives request 160 to install target pluggable database 170.

Request 160 may be sent over a network from a client that is outside of system 100. Alternatively, request 160 may be generated from within system 100. System 100 may parse request 160 to extract individual criteria.

In step 203, the rules engine detects satisfied rules whose predicates match the request. For example, rules engine 110 detects that rules 121-122 satisfy the criteria of request 160.

In a table-driven embodiment, rules engine 110 may generate a query of one or more rules tables based on criteria extracted from request 160. For example, the criteria of request 160 may be encoded as a compound WHERE clause of a query against the rules table. Execution of the query may return satisfied rules 140 or their associated suitable container databases.

In step 204, the rules engine selects a particular container database from among suitable container databases that are associated with satisfied rules. For example, satisfied rules 140 contains rules 121-122 that are associated with suitable container databases 151-153.

Rules engine 110 may choose from amongst multiple suitable container databases by choosing at random or according to rule priority. For example, rules engine 110 may encode a query with "SELECT FIRST" or "SELECT FIRST . . . ORDER BY priority DESC" to choose one of many suitable container databases. As such, steps 203-204 may be merged and share a query against a rules database.

In step 205, the target pluggable database is installed into a selected container database. For example after selecting suitable container database 151, rules engine 110 installs target pluggable database 170 into suitable container database 151. Mechanisms for pluggable database installation are discussed elsewhere herein.

4.0 Pluggable Database Transplantation

Figure 3:
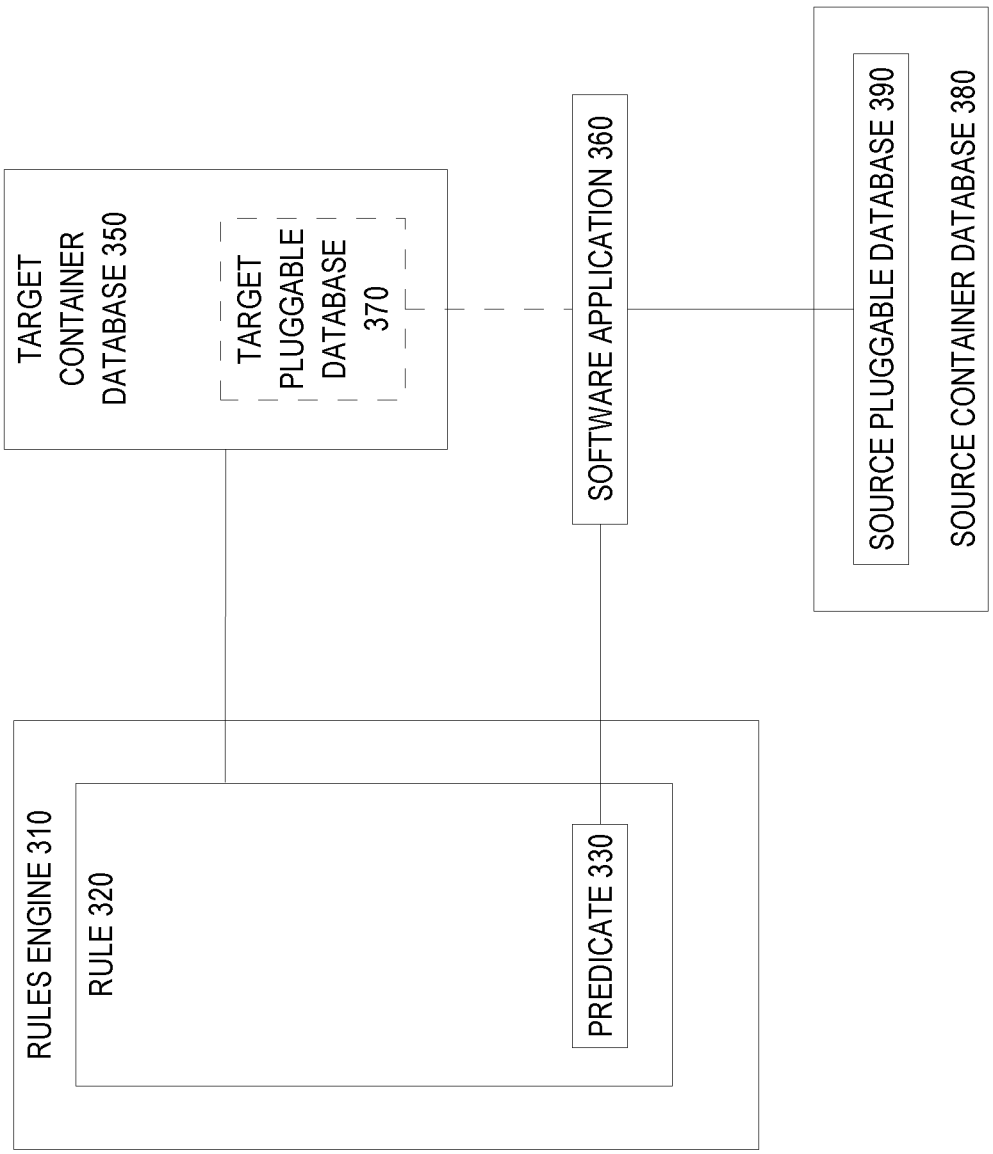
FIG. 3 is a block diagram that depicts an example computerized system that moves a pluggable database to a better suited container database, in an embodiment.

FIG. 3 is a block diagram that depicts an example system of computers 300, in an embodiment. System 300 moves a pluggable database to a better suited container database.

System 300 may be an embodiment of system 100. System 300 contains rules engine 310, container databases 350 and 390, and software application 360.

Software application 360 may be a computer program and a client of a pluggable database. Initially, software application 360 is a client of source pluggable database 390, which is hosted by source container database 380. However, conditions may change that render source container database 380 unsuitable for software application 360.

For example, source pluggable database 390 may outgrow (become too big) for source container database 380. Alternatively, source container database 380 may become too busy such as by gaining too many simultaneous user sessions, hosting too many pluggable databases, or other growing pains that may stress the capacity limits of source container database 380 or the computer that hosts it.

When source container database 380 becomes unsuitable for software application 360, system 300 may need another pluggable database to replace source pluggable database 390. That is, the contents of source pluggable database 390 should be moved into a new pluggable database that better suits the needs of software application 360.

Detection of the need to switch pluggable databases may be manual or automatic. For example, a database administrator may interactively decide to initiate the switch by informing system 300 of new suitability requirements for an existing pluggable database. In an embodiment, system 300 may periodically and automatically survey conditions and detect that source container database 380 no longer meets the needs of software application 360.

In either case, system 300 receives a request to move source pluggable database 390 away from source container database 380. This request includes criteria to ensure suitability of another container database as a target of the move.

The criteria of the request may be new, recently adjusted, or a reassertion of unchanged ongoing criteria, which source container database 380 no longer satisfies. As such, system 300 may detect whether source container database 380 has become unsuitable for source pluggable database 390.

System 300 processes this request by invoking rules engine 310 to use its rules to select another container database. For example, the criteria of this request may match predicate 330 of rule 320.

Matched rule 320 may be associated with target container database 350. As such, system 300 decides to replace source pluggable database 390, which is ill-suited for software application 360, with target pluggable database 370, which is well suited.

System 300 may accomplish this replacement by creating target pluggable database 370 within target container database 350. System 300 copies some or all of the data files of source pluggable database 390 to create target pluggable database 370.

4.1 Client Software

To software application 360, system 300 may send configuration details that software application 360 may need to integrate with target pluggable database 370. For example, system 300 may send a uniform resource locator (URL) or other parameters that are needed to connect, such as by open database connectivity (ODBC), to target pluggable database 370.

In that way, software application 360 may more or less transparently switch from source pluggable database 390 to target pluggable database 370. In an embodiment, software application 360 has a smart stub that passively tolerates or actively causes such pluggable database retargeting.

In an embodiment, system 300 accomplishes movement of a pluggable database by deleting source pluggable database 390 after populating target pluggable database 370. In an embodiment, the database server of a container database, such as 350 or 390, implements the behaviors described herein as those of system 300.

For example, a database server may orchestrate the creating, populating, and deleting of pluggable databases. For example a database server may process a command to move a pluggable database between container databases 350 and 390.

5.0 Reuse of Pluggable Database

Figure 4:
FIG. 4 is a block diagram that depicts an example computerized system that provides template pluggable databases and selects container databases in which to instantiate the templates, in an embodiment.

FIG. 4 is a block diagram that depicts an example system of computers 400, in an embodiment. System 400 provides template pluggable databases and selects container databases in which to instantiate the templates.

System 400 may be an embodiment of system 100. System 400 contains target container database 450 and repository 480.

5.1 Repository, Template, and Prototype

Repository 480 may be a database server, a file system, or other software system that can durably store pluggable databases in a template format. For example, a template may be a prototype that is an actual pluggable database instance that can be cloned. During cloning, a clone may be customized, such as configuring to suit a particular container database. Alternatively, a template may be an incomplete implementation of a pluggable database that cannot be directly used as a pluggable database.

Despite these different embodiments of a template, the techniques and mechanisms of system 400 are generally applicable to templates. For example, template pluggable database 491 may or may not be an actual prototype instance.

5.2 Template Selection

A target pluggable database is created by providing configuration details for use with a template, such as 491-492. For example, system 400 may receive installation request 460 to create a pluggable database instance.

Installation request 460 may bear an identifier of a pluggable database or template. Upon receipt of installation request 460, system 400 may use that identifier to retrieve a template pluggable database, such as 491-492, from repository 480.

Although not shown, within repository 480 may be a descriptor, for each template pluggable database, that specifies characteristics of the template pluggable database. For example, a pluggable database instance that is created from a given template would require a terabyte of disk space.

The given template may be associated with a descriptor that declares that instantiation from the template needs a terabyte of disk space. System 400 may use the details of the descriptor as suitability constraints for the rules engine of system 400.

For example, system 400 may process installation request 460 by selecting template pluggable database 491 and causing the rules engine to select suitable container database 450. System 400 may use template pluggable database 491 to create a pluggable database instance within container database 450.

System 400 may use arguments of installation request 460 as customization and configuration parameters for use with template pluggable database 491. In an embodiment, repository 480 implements the behaviors described herein as those of system 400.

In an embodiment, system 400 may facilitate a distributed pluggable database of instances, with each instance in a separate container database. These instances may be created from a template of repository 480. For example, system 400 may facilitate elastic horizontal scaling of a pluggable database.

5.3 Service Name

Multiple target pluggable databases may be copies of template pluggable database 491. As such, these similarly derived target pluggable databases conform to a particular class of pluggable databases. For example, multiple target pluggable databases may be examples of a given sales database format, including an identical relational schema.

However there may be alternate template pluggable databases with functional variations but implementing a same database application category, such as sales. For example, different release levels or business requirements may cause a template pluggable database to be forked into variations.

Some clients may need a particular variation and so may request a particular template pluggable database. However, other clients may treat similar variations as acceptable substitutes.

For example, a client might be insensitive to, or otherwise tolerate, variations of templates within a domain such as sales. System 400 may have more flexibility to select a container database for such a client if installation request 460 does not specify a particular template.

For example, template pluggable databases 491-492 may be more or less interchangeable for a sales domain. Template pluggable databases 491-492 each has a unique identifier that installation request 460 may reference.

In an embodiment, interchangeable templates may implement a same service, such as sales. Repository 480 may associate a same service name or label with interchangeable templates.

For example, both of template pluggable databases 491-492 may be labeled as "SALES" within repository 480 to indicate that both are substitutes that provide a same service or functionality. In an embodiment, installation request 460 may bear either an identifier of a template or a name of a service.

If installation request 460 bears a service name, then system 400 may detect which of the templates within repository 480 have that service name. In an embodiment, a template may have multiple service names if the template implements multiple services.

System 400 may invoke the rules engine based on multiple templates that implement a same service. This may result in more container databases, such as 450, that match the suitability criteria of installation request 460.

For example if installation request 460 bears an identifier of a particular template along with narrow suitability constraints, then the rules engine may detect that no container databases are suitable. Whereas if installation request 460 bears a service name, then the rules engine may find a suitable container database for the same narrow suitability constraints because the rules engine evaluates suitability for all templates that are associated with the service name.

6.0 Template Process

Figure 5:
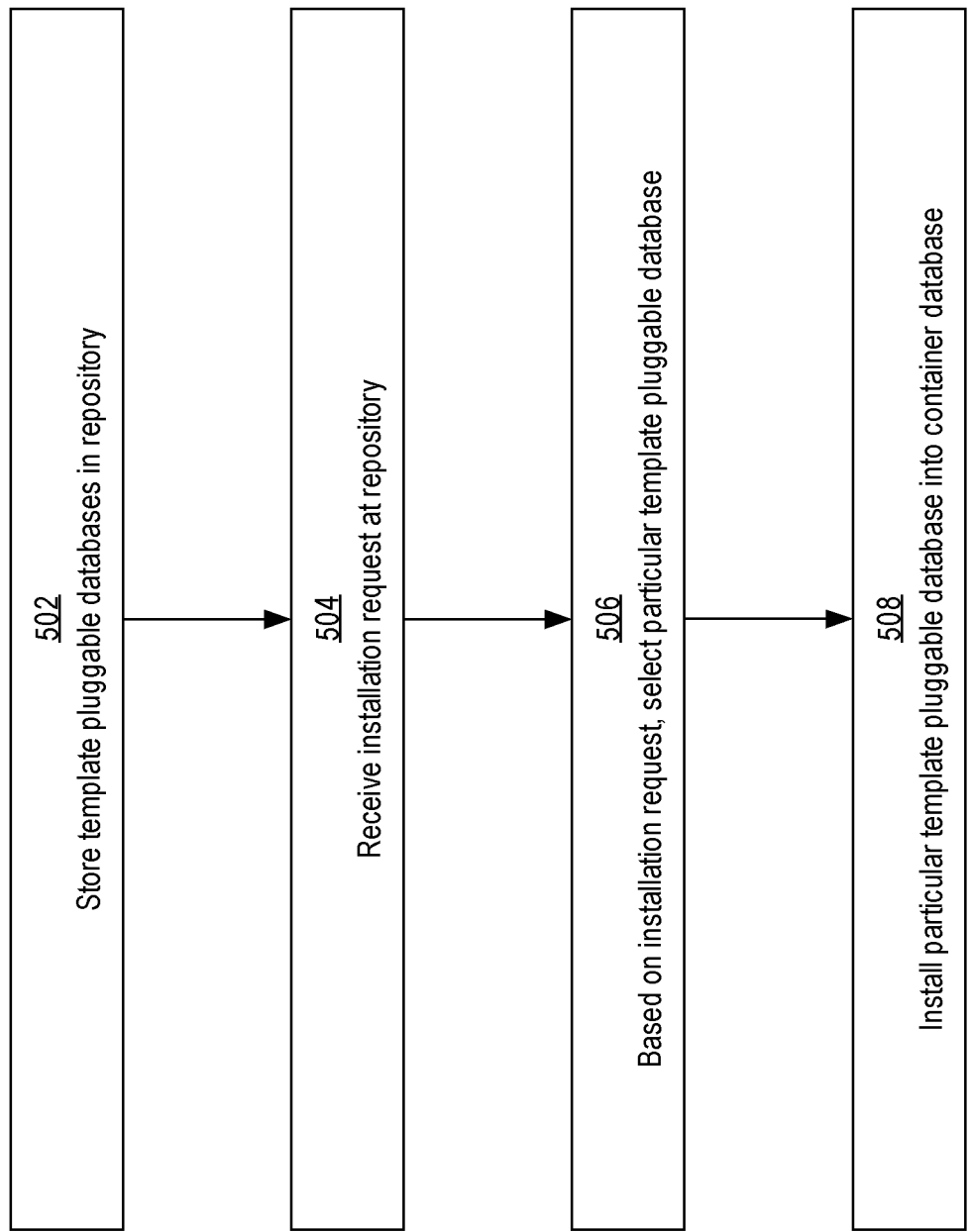
FIG. 5 is a flow diagram that depicts an example process that provides a template pluggable database and selects a container database in which to instantiate the template, in an embodiment.

FIG. 5 is a flow diagram that depicts an example process that provides a template pluggable database and selects a container database in which to instantiate the template. FIG. 5 is discussed with reference to FIG. 1.

Step 502 is preparatory. In step 201, template pluggable databases are stored within a repository.

For example, system 400 stores template pluggable databases 491-492 within repository 480. Each of template pluggable databases 491-492 may be stored as a set of files.

Stored with each of template pluggable databases 491-492 may be a descriptor that encodes suitability constraints that may be prerequisites for instantiating the template pluggable database. For example, the descriptor may be an XML file, a property file, or rows within a repository database.

In step 504, the repository receives an installation request. For example, repository 480 receives installation request 460, either from an external client or automatically generated from within system 400.

Installation request 460 may bear an identifier of a pluggable database or a template pluggable database, such as 491-492.

In step 506, a particular template pluggable database is selected based on the installation request. For example, system 400 may use the identifier from installation request 460 to select template pluggable database 491. Likewise, system 400 may use the identifier to access the descriptor that is associated with template pluggable database 491.

In step 508, the particular template pluggable database is used to install a pluggable database instance into a selected container database. For example, system 400 may use arguments of installation request 460 as suitability constraints that are input into a rules engine to select target container database 450.

System 400 may create a target pluggable database within container database 450. System 400 may copy files and other contents of template pluggable database 491 into the target pluggable database within container database 450.

System 400 may answer installation request 460 by sending metadata about container database 450 or the target pluggable database to the requesting client. For example, system 400 may send an identifier, connection parameters, or an URL that locates container database 450 or the target pluggable database.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
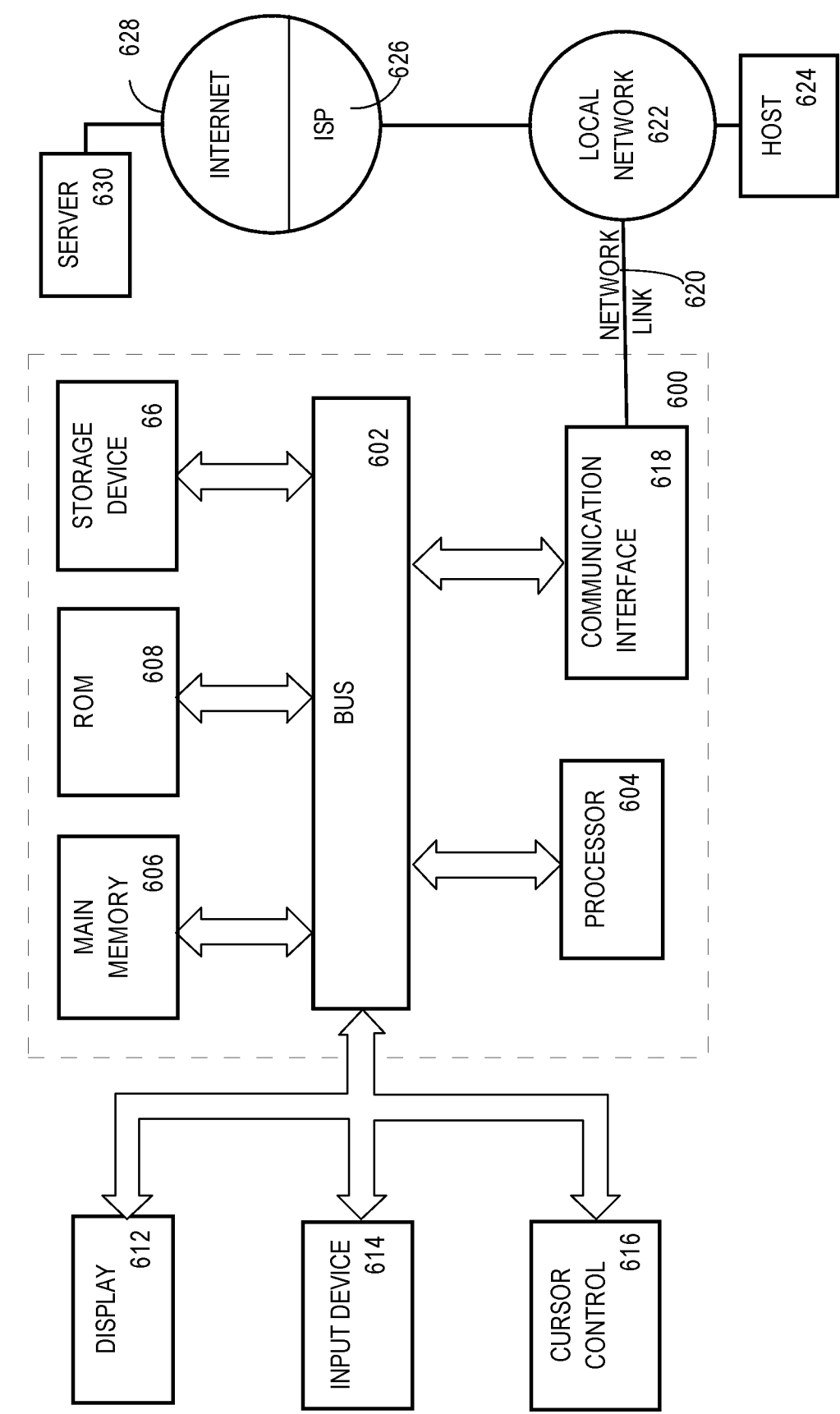
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 66, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 66. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 66. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 66 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 66, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
loading a plurality of rules into a rules engine, wherein each rule of the plurality of rules contains a predicate and a respective list that consists of multiple suitable container databases of a plurality of container databases that satisfy the rule, wherein said loading comprises at least one of: loading said plurality of rules as text, or loading said plurality of rules from a database, wherein the predicate contains a compound expression that has multiple terms connected by one or more operators;
receiving a request to install a target pluggable database;
detecting, by the rules engine, one or more satisfied rules of the plurality of rules whose predicates match the request;
selecting, by the rules engine and based on the suitable container databases of the one or more satisfied rules, a particular container database;
installing the target pluggable database into the particular container database;
wherein the method is performed by one or more computers.

2. The method of claim 1 wherein:
each rule of the one or more satisfied rules specifies a priority;
selecting the particular container database comprises selecting a rule of the one or more satisfied rules that has a highest priority.

3. The method of claim 1 wherein detecting one or more satisfied rules comprises generating a structured query language (SQL) where clause.

4. The method of claim 1 wherein:
a source container database comprises a source pluggable database;
a software application is configured to access the source pluggable database;
the method further comprises:
reconfiguring the software application to access the target pluggable database;
uninstalling the source pluggable database.

5. The method of claim 1 wherein
the predicate of each rule of the one or more satisfied rules specifies a criterion that identifies at least one of: a recovery policy, a replication policy, a downtime policy, a data retention policy, an availability of a feature, or a concurrency level.

6. The method of claim 5 wherein at least one of:
the downtime policy specifies a minimum uptime, a maximum downtime, or a minimum mean time between failures (MTBF);
the concurrency level comprises a maximum number of concurrent network sessions; or
the predicate of each rule of the satisfied rules specifies a second criterion that identifies a maximum size of a pluggable database.

7. A method comprising:
storing a first plurality of template pluggable databases in a repository that associates a service name with a second plurality of template pluggable databases that is a subset of the first plurality of template pluggable databases;
receiving an installation request that specifies said service name;
using, in response to said receiving said installation request, said service name as a lookup key to select, from said repository, said second plurality of template pluggable databases;

selecting, based on the installation request, a particular template pluggable database of the second plurality of template pluggable databases;
installing the particular template pluggable database into a container database.

8. The method of claim 7 wherein the installation request identifies the particular template pluggable database.

9. The method of claim 7 further comprising executing a structured query language (SQL) statement on the particular template pluggable database within the container database.

10. The method of claim 1 wherein:
the request to install the target pluggable database specifies an amount of a resource;
selecting the particular container database comprises detecting that the particular container database has the least amount of said resource of said suitable container databases of the one or more satisfied rules.

11. One or more non-transitory computer-readable media storing instructions that, when executed by one or more processors, cause:
loading a plurality of rules into a rules engine, wherein each rule of the plurality of rules contains a predicate and a respective list that consists of multiple suitable container databases of a plurality of container databases that satisfy the rule, wherein said loading comprises at least one of: loading said plurality of rules as text, or loading said plurality of rules from a database, wherein the predicate contains a compound expression that has multiple terms connected by one or more operators;
receiving a request to install a target pluggable database;
detecting, by the rules engine, one or more satisfied rules of the plurality of rules whose predicates match the request;
selecting, by the rules engine and based on the suitable container databases of the one or more satisfied rules, a particular container database;
installing the target pluggable database into the particular container database.

12. The one or more non-transitory computer-readable media of claim 11 wherein:
each rule of the one or more satisfied rules specifies a priority;
selecting the particular container database comprises selecting a rule of the one or more satisfied rules that has a highest priority.

13. The one or more non-transitory computer-readable media of claim 11 wherein detecting the one or more satisfied rules comprises generating a structured query language (SQL) where clause.

14. The one or more non-transitory computer-readable media of claim 11 wherein:
a source container database comprises a source pluggable database;
a software application is configured to access the source pluggable database;
the instructions further cause:
reconfiguring the software application to access the target pluggable database;
uninstalling the source pluggable database.

15. The one or more non-transitory computer-readable media of claim 11 wherein
the predicate of each rule of the one or more satisfied rules specifies a criterion that identifies at least one of: a recovery policy, a replication policy, a downtime policy, a data retention policy, an availability of a feature, or a concurrency level.

16. The one or more non-transitory computer-readable media of claim 15 wherein at least one of:
the downtime policy specifies a minimum uptime, a maximum downtime, or a minimum mean time between failures (MTBF);
the concurrency level comprises a maximum number of concurrent network sessions; or
the predicate of each rule of the satisfied rules specifies a second criterion that identifies a maximum size of a pluggable database.

17. One or more non-transitory computer-readable media storing instructions that, when executed by one or more processors, cause:
storing a first plurality of template pluggable databases in a repository that associates a service name with a second plurality of template pluggable databases that is a subset of the first plurality of template pluggable databases;
receiving an installation request that specifies said service name;
using, in response to said receiving said installation request, said service name as a lookup key to select, from said repository, said second plurality of template pluggable databases;
selecting, based on the installation request, a particular template pluggable database of the second plurality of template pluggable databases;
installing the particular template pluggable database into a container database.

18. The one or more non-transitory computer-readable media of claim 17 wherein the installation request identifies the particular template pluggable database.

19. The one or more non-transitory computer-readable media of claim 17 wherein the instructions further comprise instructions that, when executed by one or more processors, cause executing a structured query language (SQL) statement on the particular template pluggable database within the container database.

* * * * *